(No Model.)

J. B. RHODES.
DEVICE FOR SIDE DRESSING SAW TEETH.

No. 441,701. Patented Dec. 2, 1890.

WITNESSES:
Claude R. Buchanan
Lulu O. Pierce

INVENTOR
James B. Rhodes,
BY
Moulton & Rogers,
ATTORNEYS

UNITED STATES PATENT OFFICE.

JAMES B. RHODES, OF GRAND RAPIDS, MICHIGAN.

DEVICE FOR SIDE-DRESSING SAW-TEETH.

SPECIFICATION forming part of Letters Patent No. 441,701, dated December 2, 1890.

Application filed April 21, 1890. Serial No. 348,897. (No model.)

*To all whom it may concern:*

Be it known that I, JAMES B. RHODES, a citizen of the United States, residing at Grand Rapids, in the county of Kent and State of Michigan, have invented certain new and useful Improvements in Implements for Side-Dressing Saw-Teeth; and I do hereby declare the following to be a full, clear, and exact description of the invention, such as will enable others skilled in the art to which it appertains to make and use the same.

My invention relates to an implement for side-dressing saw-teeth; and it consists in the construction, combination, and arrangement of the various parts and details hereinafter described, and pointed out in the claims, reference being had to the accompanying drawings, wherein—

Figure 1:
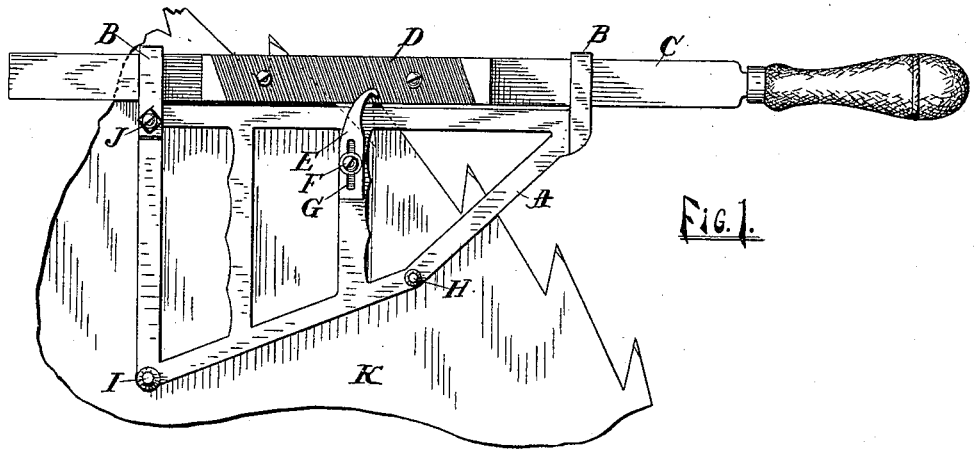
Figure 2:
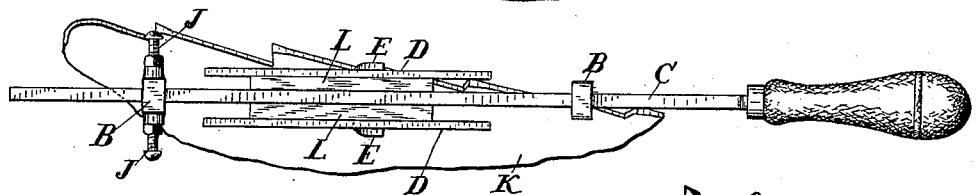
Figure 3:
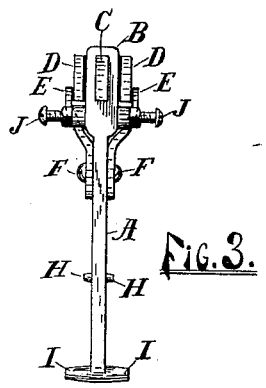

Figure 1 is a side elevation of a device embodying my invention attached to a circular saw; Fig. 2, a plan of the same, and Fig. 3 an end elevation.

Like letters indicate like parts throughout the drawings.

A represents a suitable frame-work adapted to be held against the side of the saw, and has studs H H and I I permanently attached thereto, and which operate in conjunction with adjustable studs J J for adjusting the angle of the frame to the saw. Mounted upon the frame are loop-guides B B for the sliding bar C, provided with a suitable handle. Adjustably attached to the sides of the frame are hooks E E, adapted to rest upon the saw-teeth and provided with slots G, in which are the set-screws F F for securing them to the frame A. Secured upon each side of the bar C are files D D for dressing the teeth, provided with holes for receiving the screws by which they are secured to the bar, and between the files and the bar are arranged the blocks L L.

K represents the saw.

The implement is designed as a hand-tool and operates as follows: Place the hook E upon the point of the tooth to be side-dressed, adjust the stud J to give the file the proper angle of inclination relative to the point of the tooth, and adjust the frame to give the sliding bar C the proper vertical inclination. With one hand hold the frame against the side of the saw, (the ends of the studs in contact therewith,) and with the other hand move the sliding bar back and forth (the file in contact with the tooth) until the file ceases to cut, when the point of the tooth will be found to have the proper side dress. Proceed with the next tooth. When all the teeth are dressed upon one side, shift the implement to the other side of the saw, bringing the opposite hook, studs, and files into action, and proceed until the saw is finished.

It will be noted that only the lower margins of the files are engaged. Therefore when worn upon one margin they may be reversed and the opposite margin used, and when one side of the file is worn out it may be turned over and the opposite side used.

I claim—

1. An implement for side-dressing saw-teeth, consisting of a frame adapted to be held against the saw, having permanent studs and an adjustable stud acting in conjunction therewith in contact with the saw, a hook secured to the frame, adapted to rest on the point of the saw-tooth, and a sliding bar carrying a file mounted on the frame, adapted to engage the side of the point of the tooth, substantially as set forth.

2. In an implement for side-dressing saw-teeth, the combination of a frame adapted to support a movable bar and be held against the side of the saw, permanent studs secured to the sides of the frame, an adjustable stud acting in conjunction therewith for adjusting the angle of the frame to the saw, a bar mounted on said frame longitudinally movable thereon, carrying a file adapted to engage the sides of the point of the saw-tooth, and a hook adapted to rest on the point of the tooth to be dressed, substantially as described, and for the purposes set forth.

3. In an implement for side-dressing saw-teeth, the combination of a frame adapted to support a movable bar and provided with guides for a bar adapted to move longitudinally thereon and with studs adapted to adjust the angle of said frame to the saw and to be held against the same, substantially as set forth, a bar arranged in said guides and movable therein, a reversible file secured to said bar and moving with the same, and an adjustable hook adapted to rest upon the point of the tooth to be swaged, substantially as described.

4. In an implement for side-dressing saw-teeth, and in combination with a frame adapted to be held against the side of the saw and provided with means, substantially as described, for adjusting the angle of inclination of the frame to the saw, and a hook adjustably secured to the frame, adapted to rest upon the point of the tooth, and guides secured to the frame, having a movable bar in said guides, the herein-described reversible file provided with holes for securing the same to said bar, when secured to said bar, substantially as set forth, and for the purpose described.

5. The herein-described implement for side-dressing saw-teeth, consisting of a frame A, having studs I I H H permanently secured upon opposite sides thereof and extending in opposite directions, adjustable studs J J, arranged in like manner, adjustable hooks E E, having slots G and bolts F in the slots, guide-loops B B, mounted on the frame, a bar C, movable in the loops, files D D, secured to the bar C upon opposite sides thereof, and blocks L L between the bar and files, arranged substantially as described, and for the purposes set forth.

In testimony whereof I affix my signature in presence of two witnesses.

JAMES B. RHODES.

Witnesses:
DENNIS L. ROGERS,
LUTHER V. MOULTON.